Patented Apr. 29, 1930

1,756,623

UNITED STATES PATENT OFFICE

ABRAHAM S. BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

BASE EXCHANGE MATERIAL AND METHOD OF PREPARING SAME

No Drawing.   Application filed April 24, 1924. Serial No. 708,671.

This invention relates to the preparation of zeolites or base exchange materials and in particular to the preparation of such materials by what is known generally as the "wet method", as distinguished from baking, sintering or fusing the component constituents. The invention may further be classified as an improvement in the preparation of base exchange materials in which sodium aluminate and silicic acid, or their equivalents, are employed.

It has long been known that substances resembling zeolites in chemical composition, characteristics and action could be formed by the reaction of sodium aluminate on hydrated silica. But according to the methods heretofore proposed for the formation of such substances, the end product obtained was poorly adapted for technical use because of the unsatisfactory and unstable physical condition of the materials.

The object of this invention is to provide a method for treating silicic acid, or silicic acid gel, with sodium aluminate, or equivalent alkaline solutions of amphoteric hydroxides, for the production of base exchange materials which shall have the proper chemical and physical characteristics requisite for present-day industrial practice, and to effect economies in procedure accompanied by ease and convenience in operation and handling.

In attainment of the object of the invention I prefer to employ silicic acid, in colloidal solution, which may conveniently be prepared by adding to the solution of an alkali metal silicate, an amount of acid in excess of that required to neutralize the total alkalinity of the silicate. In the optional procedure, silicic acid gel may be prepared by partially or completely neutralizing a solution of an alkali metal silicate. The gel may be moist or undried when subjected to reaction with the solution of sodium aluminate, or it may have been dried and so used either with or without previous washing to remove soluble compounds.

In the preferred method of preparation, a colloidal solution of silicic acid, prepared as above, is treated with a solution of sodium aluminate, using such proportion and concentration of the reagents, that the resulting gel embraces the entire reaction volume without subsequent separation of mother liquor. Upon drying, the mass breaks into small hard lumps which granulate when wetted. These granules are of suitable size for employment in the softening of water in the well known way, but they may be made smaller by crushing to suit a particular requirement.

A specific example of the preferred procedure according to the invention is as follows: 6 liters of commercial sodium silicate solution, 40° Baumé containing about 9% $Na_2O$ and 28.5% $SiO_2$ is diluted to 45 liters. To this is added 14 liters of dilute sulphuric acid containing about 112 grams $H_2SO_4$ per liter and thoroughly mixed. The colloidal solution of silicic acid resulting, will remain in a liquid state for a long period. This is mixed with 22 liters of a solution of sodium aluminate containing about 20 grams $Na_2O$ and 14 grams $Al_2O_3$ per liter. In these proportions, the mixture will be alkaline to phenolphthalein. It is preferable that prior to mixing both solutions be cooled to about 5° C., in which case the mixture remains fluid for about a minute, after which, it gradually sets to a stiff, firm gel embracing all of the reaction volume. The gel is dried at a temperature under 100° C., preferably at about 80° C. Upon drying, the mass breaks into small, hard lumps which in subsequent wetting are resolved into hard, vitreous granules, having a density of from 50 to 55 pounds per cubic foot, and an exchange capacity of about 250 grains calcium carbonate equivalent per pound.

Where silicic acid or silicic acid gel is used I prefer to employ particles of dried gel about the size desired in the final product. Such particles are boiled for two hours in a solution of sodium aluminate, containing about 3 grams $Na_2O$ and 2.2 grams $Al_2O_3$ per liter and thereafter for two hours in a solution of the same character but twice as strong. The particles are then washed to remove excess solution and dried, when they are ready for use in the softening of water. These particles are hard, strong and resistive to the powdering action of water, they possess a high base exchange capacity and are otherwise suitable for technical use.

These illustrations of the application of the principles of the invention by no means embrace all of the possibilities for improvement over the prior practices as obviously the invention is susceptible of employment within a wide range of equivalents utilizing variations and modifications in the strength, proportions and composition of the reagents and in the times and temperatures for treatment.

In the preferred example cited it is not absolutely essential that all of the constituent elements of the reagents be embraced in the gel although I consider that it is conducive of better results to employ solutions of a degree of concentration which will bring about that result.

The chemical composition of the final product may be altered to advantage for certain purposes by increasing the silica content according to the disclosure of my co-pending application Serial No. 700,822, filed March 21, 1924. Also a very satisfactory material may be produced by varying the proportions of the reagents so that the mixture is neutral to phenolphthalein or litmus but alkaline to methyl orange.

Other modifications in procedure, variations in constituents and additions in refinement of the product according to either example, will undoubtedly occur to those skilled in the art as a result of the disclosure herein, and be based upon the underlying principles of the invention as defined in the appended claims.

The word "amphoterate" in the claims includes the salts of the acids of the amphoteric metals such as the aluminates.

I claim:

1. The process of preparing base exchange materials which comprises treating colloidal solution of silicic acid with an alkali metal aluminate.

2. The process of preparing base exchange materials which comprises treating colloidal solution of silicic acid with an alkali metal aluminate and removing all the moisture.

3. The process of preparing base exchange materials which comprises treating a colloidal solution of silicic acid with a solution of an alkali metal aluminate, removing the moisture and dividing the mass into small particles suitable for use in the softening of water.

4. The process of preparing base exchange materials which comprises mixing a cooled colloidal solution of silicic acid with a cooled solution of sodium aluminate to form a gel, drying the gel and then wetting it to reduce it to small particles.

5. The process of preparing a metallo-silicate which comprises treating a solution of sodium silicate with an acid, then subjecting it to the action of a solution of sodium aluminate, and drying the resulting gel.

6. The process of preparing base exchange materials which comprises treating a colloidal solution of silicic acid with a solution of an alkali metal aluminate, drying the resulting gel and then wetting it.

7. The process of preparing base exchange materials which comprises mixing a colloidal solution of silicic acid with a solution of an alkali metal aluminate in such proportion and degree of concentration that a firm stiff gel is formed embracing the entire reaction volume, and drying the gel.

8. The process of preparing a metallo-silicate which comprises treating a solution of sodium silicate with sulphuric acid, then subjecting it to the action of sodium aluminate, drying the resulting gel and then wetting it to form hard vitreous particles suitable for use in the softening of water.

9. The process of preparing a metallo-silicate which comprises treating a solution of sodium silicate with a quantity of acid in excess of that required to neutralize the total alkalinity, then mixing it with a solution of sodium aluminate and drying the resulting gel.

10. The process of preparing a metallo-silicate which comprises treating an alkali metal silicate with a quantity of acid in excess of that required to neutralize the total alkalinity, then mixing it with a solution of an alkali metal amphoterate and drying the resulting gel.

11. A metallo-silicate substantially identical with the precipitate of mixed solutions of colloidal silicic acid and alkali metal aluminate.

12. The process of preparing base exchange materials which comprises providing a colloidal solution of silicic acid, providing an alkaline solution of an amphoteric hydroxide and mixing the two solutions.

13. The process of preparing base exchange materials which comprises providing a suspension of colloidally dispersed particles of hydrated silica and mixing this suspension with an alkaline solution of an amphoteric hydroxide.

14. The process of preparing base exchange materials which comprises mixing a colloidal solution of silicic acid with an alkaline solution of an amphoteric hydroxide, a substantially larger volume of the colloidal solution of silicic acid being used than the volume of the alkaline solution of the amphoteric hydroxide.

15. The process of preparing base exchange materials which comprises adding a colloidal solution of silicic acid to an alkaline solution of an amphoteric hydroxide.

In testimony whereof I have hereunto subscribed my name.

ABRAHAM S. BEHRMAN.